United States Patent
Peng et al.

(10) Patent No.: US 8,279,530 B2
(45) Date of Patent: Oct. 2, 2012

(54) ZOOM LENS SYSTEM

(75) Inventors: Fang-Ying Peng, Taipei Hsien (TW);
Hai-Jo Huang, Taipei Hsien (TW);
Sheng-An Wang, Taipei Hsien (TW);
Xiao-Na Liu, Guangdong (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 126 days.

(21) Appl. No.: 12/973,799

(22) Filed: Dec. 20, 2010

(65) Prior Publication Data
US 2012/0099208 A1 Apr. 26, 2012

(30) Foreign Application Priority Data
Oct. 22, 2010 (CN) .......................... 2010 1 0516286

(51) Int. Cl.
*G02B 15/14* (2006.01)
(52) U.S. Cl. ........................................ 359/683; 359/676
(58) Field of Classification Search .................. 359/676, 359/683
See application file for complete search history.

(56) References Cited

U.S. PATENT DOCUMENTS

| 5,818,646 A * | 10/1998 | Hamano | 359/684 |
| 6,587,280 B2 * | 7/2003 | Horiuchi | 359/684 |
| 7,116,489 B2 * | 10/2006 | Ohtake | 359/687 |

FOREIGN PATENT DOCUMENTS
CN 100516965 C 7/2009
* cited by examiner

*Primary Examiner* — David N Spector
(74) *Attorney, Agent, or Firm* — Altis Law Group, Inc.

(57) ABSTRACT

A zoom lens system is used for imaging an object to an image plane. The system, in the order from the object side to the image plane, includes a first lens group with positive refraction power, a second lens group with negative refraction power, a third lens group with positive refraction power, an aperture stop, a fourth lens group with positive refraction power, and a fifth lens group with negative refraction power. The fifth lens group comprises a lens of negative refraction power and a lens of positive refraction power. The system satisfies the formulas: $-0.18 < f2/ft < -0.13$; and $V11 - V12 < 20$, wherein f2 is the effective focal length of the second lens group, ft is the effective focal length of the system in the telescopic state, V11 is the Abbe number of the lens of negative refraction power, and V12 is the Abbe number the lens of positive refraction power.

8 Claims, 10 Drawing Sheets

ZOOM LENS SYSTEM

BACKGROUND

1. Technical Field

The present disclosure relates to lens systems and, particularly, to a zoom lens system.

2. Description of Related Art

A zoom lens system is usually mounted in a main body of a camera and comprises at least one group of lenses. The lenses can be moved within a specific range to adjust the zoom lens system between a wide angle state and a telescopic state. One of challenges of such zoom lens systems is: the greater the specific range, the bigger the main body. On the other hand, if the specific range is short, a zoom ratio of the zoom lens system will be limited. Therefore, it is necessary to provide a zoom lens system which can overcome the problems described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments.

DETAILED DESCRIPTION

Embodiments of the present disclosure will now be described in detail below, with reference to the accompanying drawings.

Figure 1:
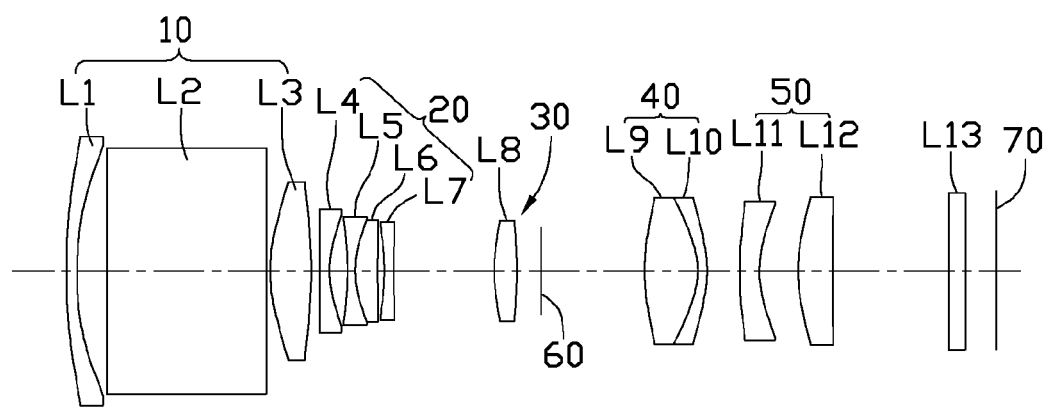
FIG. 1 is a schematic view of a zoom lens system according to an exemplary embodiment.

Referring to FIG. 1, a zoom lens system 100, according to an exemplary embodiment, is used for imaging an object to an image plane 70. The zoom lens system 100 includes, in the order from the object side to the image plane 70 thereof, a first lens group 10 with positive refraction power, a second lens group 20 with negative refraction power, a third lens group 30 with positive refraction power, a fourth lens group 40 with positive refraction power, and a fifth lens group 50 with negative refraction power.

The first lens group 10, the third lens group 30, and the fifth lens group 50 are fixed. The second lens group 20 and the fourth lens group 40 are slidable along the optical axis of the zoom lens system 100. Thereby, the effective focal length of the zoom lens system 100 can be adjusted by moving the second lens group 20 and the fourth lens group 40 along the optical axis thereof. In particular, the distance between the first lens group 10 and the second lens group 20 along the optical axis of the zoom lens system 100 increases when the zoom lens system 100 is adjusted from the wide angle state to the telescopic state.

The first lens group 10 includes, in the order from the object side to the image plane 70 of the zoom lens system 100, a first lens L1 with negative refraction power, a second lens L2, a third lens L3 with positive refraction power.

The first lens L1 comprises a first surface convex toward the object side of the zoom lens system 100 and a second surface concave toward the image plane 70 of the zoom lens system 100. The second lens L2 is a prism and comprises a third surface planar toward the object side of the zoom lens system 100 and a fourth surface planar toward the image plane 70 of the zoom lens system 100. The third lens L3 comprises a fifth surface convex toward the object side of the zoom lens system 100 and a sixth surface convex toward the image plane 70 of the zoom lens system 100.

The second lens group 20 includes, in the order from the object side to the image plane 70, a fourth lens L4 with negative refraction power, a fifth lens L5 with negative refraction power, a sixth lens L6 with positive refraction power, and a seventh lens L7 with negative refraction power.

The fourth lens L4 comprises a seventh surface convex toward the object side of the zoom lens system 100 and a eighth surface concave toward the image plane 70 of the zoom lens system 100. The fifth lens L5 and the sixth lens L6 are bonded together by adhesive and comprise a ninth surface concave toward the object side of the zoom lens system 100, a tenth surface and a eleventh surface convex toward the image plane 70 of the zoom lens system 100. The seventh lens L7 comprises a twelfth surface concave toward the object side of the zoom lens system 100 and a thirteenth surface convex toward the image plane 70 of the zoom lens system 100.

The third lens group 30 includes an eighth lens L8 with positive refractive power.

The eighth lens L8 comprises a fourteenth surface convex toward the object side of the zoom lens system 100 and a fifteenth surface convex toward the image plane 70 of the zoom lens system 100. The eighth lens L8 is made of plastic.

The zoom lens system 100 further includes an aperture stop 60 positioned between the third lens group 30 and the fourth lens group 40. The aperture stop has a sixteenth surface planar toward the object side of the zoom lens system 100.

The fourth lens group 40 includes, in the order from the object side to the image plane 70, a ninth lens L9 with positive refraction power, a tenth lens L10 with negative refraction power.

The ninth lens L9 and the tenth lens L10 are bonded together by adhesive and comprise a seventeenth surface convex toward the object side of the zoom lens system 100, and an eighteenth surface and a nineteenth surface convex toward the image plane 70 of the zoom lens system 100.

The fifth lens group 50 includes, in the order from the object side to the image plane 70, an eleventh lens L11 with negative refraction power, a twelfth lens L12 with positive refraction power.

The eleventh lens L11 comprises a twentieth surface convex toward the object side of the zoom lens system 100 and a twenty-first surface concave toward the image plane 70 of the zoom lens system 100. The twelfth lens L12 comprises a twenty-second surface convex toward the object side of the zoom lens system 100 and a twenty-third surface convex toward the image plane 70 of the zoom lens system 100.

The zoom lens system 100 further includes a filter L13 positioned between the fifth lens group 50 and the image plane 70. The filter L13 has a twenty-fourth surface planar toward the object side of the zoom lens system 100 and a twenty-fifth surface planar toward the image plane 70 of the zoom lens system 100.

The zoom lens system 100 is applied in cameras and set to satisfy the following formulas:

$$-0.18 < f2/ft < -0.13; \quad (1)$$

$$V11 - V12 < 20; \quad (2)$$

Wherein, f2 is the effective focal length of the second lens group 20, ft is the effective focal lengths of the zoom lens system 100 in the telescopic state, V11 is the Abbe number of the eleventh lens L11, and V12 is the Abbe number of the twelfth lens L12.

The formulas (1) can limit effective focal length of the second lens group 20. When $-0.18 < f2/ft < -0.13$, the total length of the zoom lens system can be reduced and the chromatic aberration can be efficiently compensated to get high quality images. The formulas (2) can make the horizontal chromatic aberration sufficiently compensated when the zoom lens system 100 in the wide angle state and telescopic state.

The zoom lens system 100 is further set to satisfy the following formula:

$$0.4 < Ds/D < 0.6; \quad (3)$$

wherein, Ds is the distance between the aperture stop 60 to the image plane 70 along the optical axis of the zoom lens system 100, D is the total length of the of the zoom lens system 100, concretely, D is the distance between the vertex of the first surface and the image plane 70 along the optical axis of the zoom lens system 100. The formula (3) is for further reducing the total length D of the zoom lens system 100.

The zoom lens system 100 further satisfies the following formula:

$$V5 - V6 > 50; \quad (4)$$

wherein, V5 is the Abbe number of the fifth lens L5; V6 represent the Abbe number of the sixth lens L6. Formula (4) is for reducing the aberration of the field curvature and spherical aberration in the zoom process.

The zoom lens system 100 further satisfies the following formula:

$$0.1 < M2/D < 0.17; \quad (5)$$

wherein, M2 is a moving distance which the second lens group 20 moves from the wide angle state to the telescope state. Formula (5) is for increasing the zoom ratio and limiting the moving distance M2.

In one embodiment, the fifth surface, the sixth surface, the fourteenth surface, the fifteenth surface and the seventeenth surface are aspherical surfaces. The above aspherical surfaces are shaped according to the formula:

$$x = \frac{ch^2}{1 + \sqrt{1 - (k+1)c^2h^2}} + \sum A_i h^i$$

wherein h is a height from the optical axis of the zoom lens system 100 to the aspherical surface, c is a vertex curvature, k is a conic constant, and Ai is i-th order correction coefficients of the aspherical surfaces.

The following tables 1-4 show the specification of the exemplary embodiment of the zoom lens system 100. The following are symbols used in the exemplary embodiment.

f: effective focal length of the zoom lens system 100;

d6: the distance between the first lens group 10 and the second lens group 20 along the optical axis of the zoom lens system 100 (the distance between the sixth surface and the seventh surface);

d13: the distance between the second lens group 20 and the third lens group 30 along the optical axis of the zoom lens system 100 (the distance between the thirteenth surface and the fourteenth surface);

d16: the distance between the third lens group 30 and the fourth lens group 40 along the optical axis of the zoom lens system 100 (the distance between the fifteenth surface and the seventeenth surface);

d19: the distance between the fourth lens group 40 and the fifth lens group 50 along the optical axis of the zoom lens system 100 (the distance between the nineteenth surface and the twentieth surface);

$F_{No}$: F number;

2ω: field angle;

r: radius of curvature.

d: distance between two adjacent lens surfaces along the optical axis of the zoom lens system 100.

Nd: refractive index of lens.

V: Abbe number.

TABLE 1

| surface | shape | r(mm) | d(mm) | Nd | V |
|---|---|---|---|---|---|
| 1st | spherical | 4.93 | 0.0768 | 1.92 | 20.88 |
| 2nd | spherical | 2.37 | 0.233 | — | — |
| 3rd | spherical | infinity | 1.2148 | 1.846 | 23.78 |
| 4th | spherical | infinity | 0.032 | — | — |
| 5th | aspherical | 1.72 | 0.313 | 1.62 | 58.16 |
| 6th | aspherical | −4.45 | d6 | — | — |
| 7th | spherical | 93.24 | 0.0765 | 2.00 | 25.458 |
| 8th | spherical | 1.00 | 0.137 | — | — |
| 9th | spherical | −2.98 | 0.0618 | 1.497 | 81.6 |
| 10th | spherical | 0.958 | 0.169 | 1.92 | 20.88 |
| 11th | spherical | 23.37 | 0.053 | — | — |
| 12th | spherical | −2.13 | 0.068 | 1.91 | 35.25 |
| 13th | spherical | 7.84 | d13 | — | — |
| 14th | aspherical | 1.825 | 0.1723 | 1.53 | 56.04 |
| 15th | aspherical | −3.118 | 0.184 | — | — |
| 16th | Aperture stop | infinity | d16 | — | — |
| 17th | aspherical | 1.96 | 0.4 | 1.497 | 81.6 |
| 18th | spherical | −1.011 | 0.0726 | 1.698 | 30.05 |
| 19th | spherical | −1.605 | d19 | — | — |
| 20th | spherical | 3.26 | 0.151 | 1.846 | 23.78 |
| 21st | spherical | 1.122 | 0.296 | — | — |
| 22nd | spherical | 1.706 | 0.263 | 1.636 | 35.37 |
| 23rd | spherical | 17.385 | 1.17641 | — | — |
| 24th | spherical | infinity | 0.046 | 1.517 | 64.198 |
| 25th | spherical | infinity | 0.077 | 1.51 | 64.198 |
| Image plane 70 | spherical | infinity | — | — | — |

TABLE 2

| surface | Aspherical surface coefficient |
|---|---|
| 5th | k = 0.0159; A4 = −0.023973928; A6 = 0.0006177707; A8 = 0.070664986; A10 = −0.090792313 |
| 6th | k = −23.207; A4 = −0.033209938; A6 = 0.067898734; A8 = −0.051893694; A10 = 0.0018658404 |
| 14th | k = 0.985; A4 = 0.055093001; A6 = 0.48632263; A8 = 1.5478797; A10 = −3.197526 |
| 15th | k = −6.097; A4 = 0.12601586; A6 = 0.53850965; A8 = 1.2471389; A10 = −0.7966337 |
| 17th | k = −0.0506; A4 = 0.066033221; A6 = 0.016824685; A8 = 0.020503937; A10 = −0.0030713616 |

TABLE 3

| The state of the zoom lens system 100 | F(mm) | d6(mm) | d13(mm) | d16(mm) | d19(mm) |
|---|---|---|---|---|---|
| The wide angle state | 1 | 0.062 | 1.21123 | 1.41 | 0.25 |
| The middle state | 2.1 | 0.74 | 0.53 | 0.865 | 0.804 |
| The telescopic state | 4.53 | 1.21 | 0.06 | 0.305 | 1.36 |

TABLE 4

| The state of the zoom lens system 100 | f | $F_{No}$ | 2ω |
|---|---|---|---|
| The wide angle state | 1 | 3.94 | 66.7° |
| The middle state | 2.1 | 4.35 | 32.2° |
| The telescopic state | 4.53 | 5.42 | 15.2° |

Figure 2:
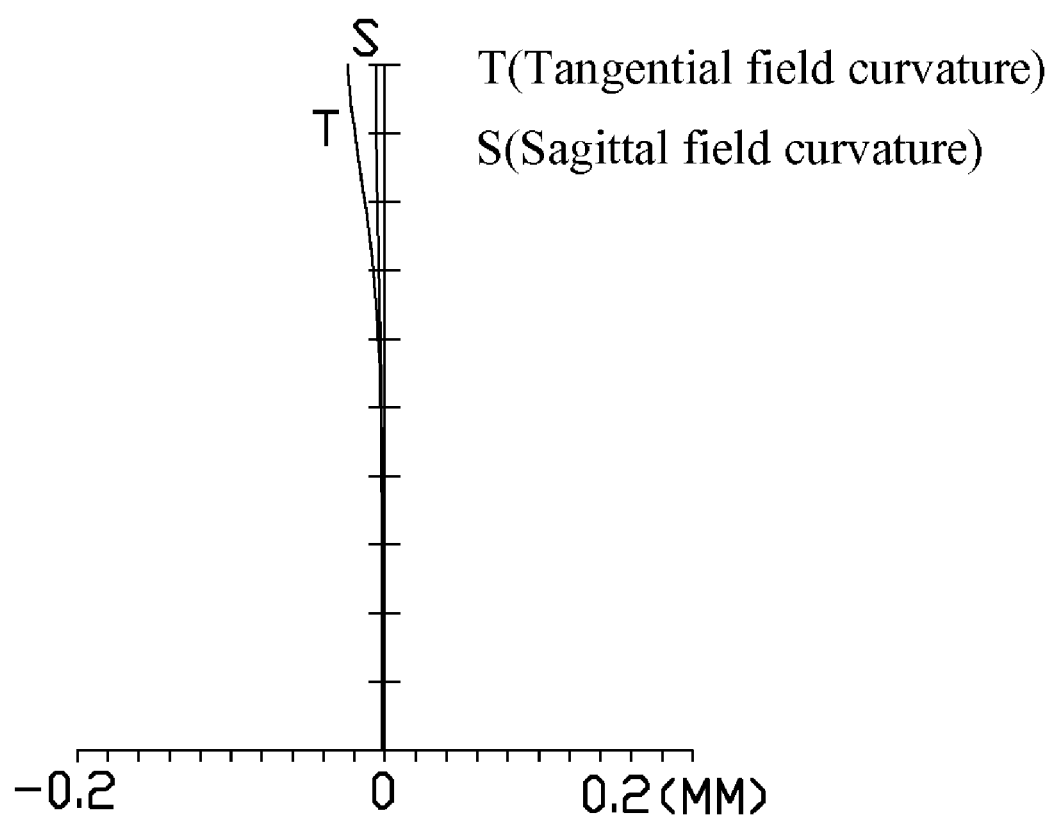
FIGS. 2~4 are graphs respectively showing field curvature, distortion and spherical aberration occurring in the zoom lens system, when the zoom lens system is in a wide angle state.
Figure 3:
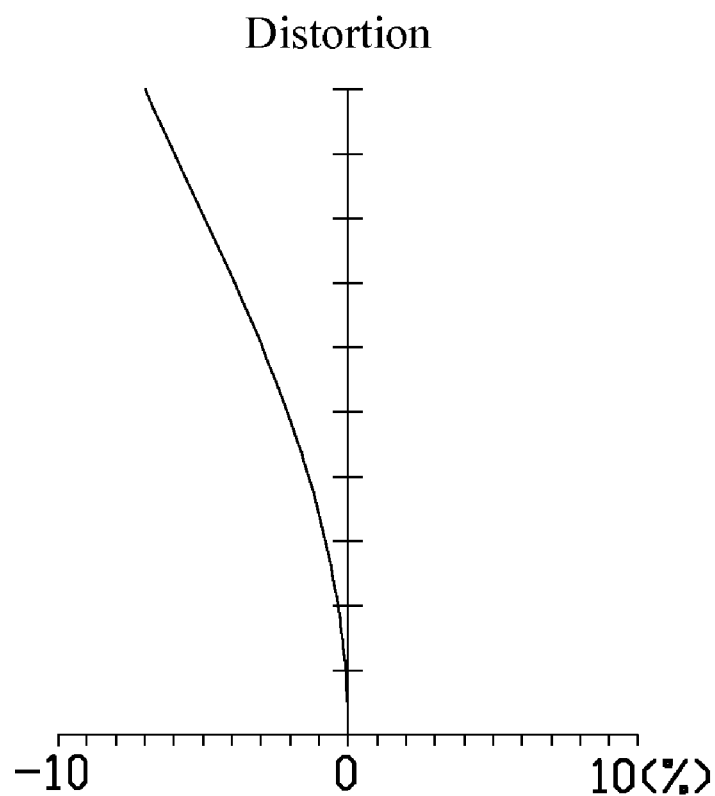
Figure 4:
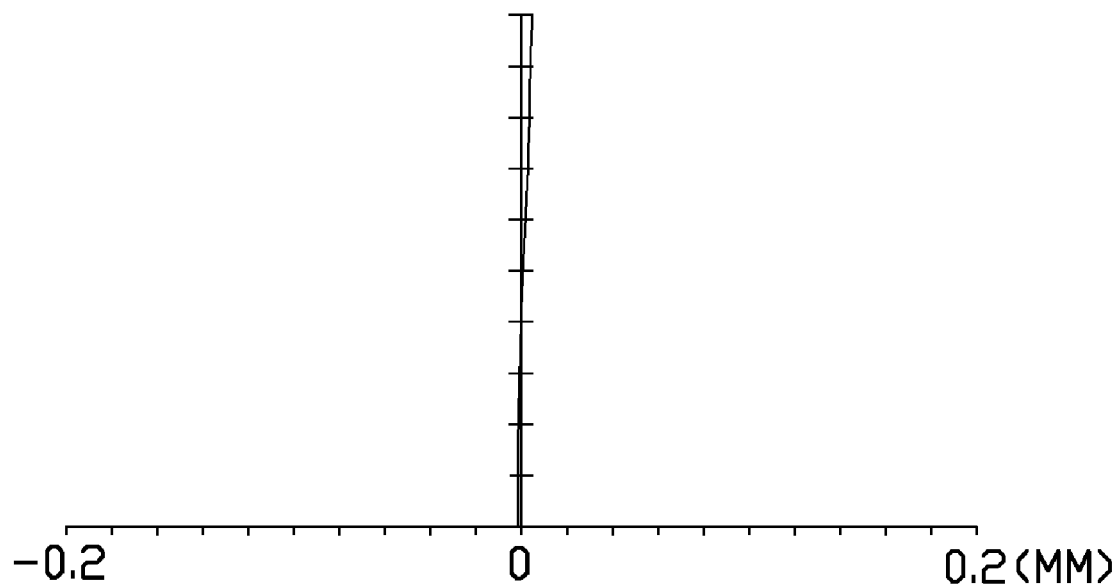

Referring to FIGS. 2-4, showing the field curvature, distortion, and spherical aberration of the zoom lens system 100 in the wide angle state, and the wavelength of the light is 588 nm. In FIG. 2, the curves T and S respectively represent the tangential field curvature curve and the sagittal field curvature curve. The field curvature of is from −0.04 mm to 0.02 mm. In FIG. 3, the distortion is from −6% to 0. In FIG. 4, the curve is a spherical aberration characteristic curve. The spherical aberration is from −0.02 mm to 0.02 mm.

Figure 5:
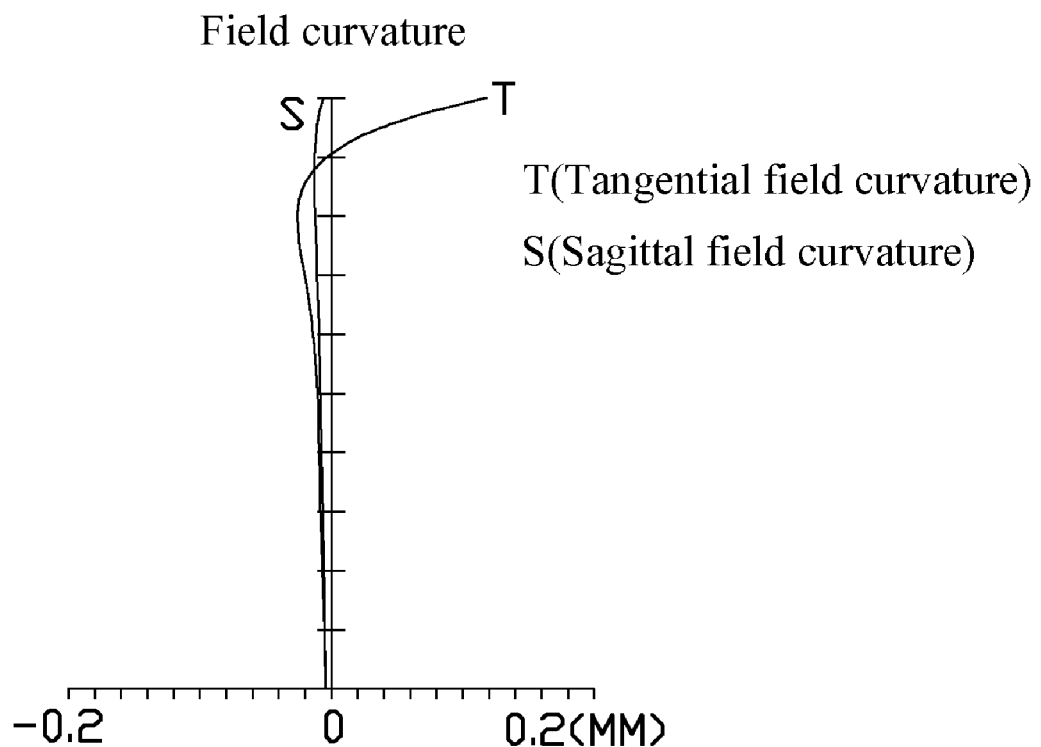
FIGS. 5~7 are graphs respectively showing field curvature, distortion and spherical aberration occurring in the zoom lens system, when the zoom lens system is in a mid-range state.
Figure 6:
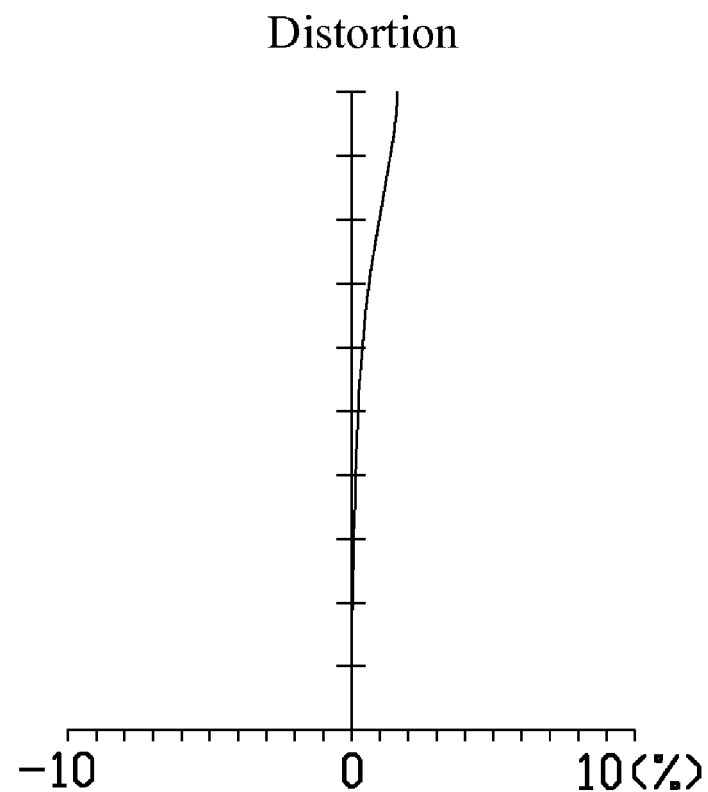
Figure 7:
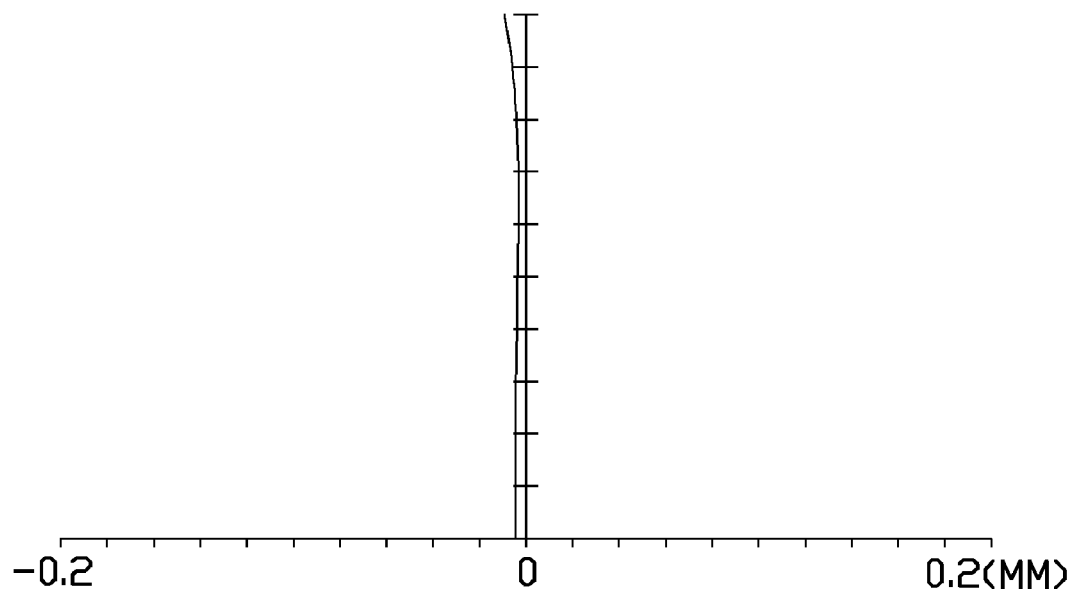

Referring to FIGS. 5-7, showing the field curvature, distortion, and spherical aberration of the zoom lens system 100 in the middle state are shown, and the wavelength of the light is 588 nm. In FIG. 5, the field curvature is from −0.02 mm to 0.14 mm. In FIG. 6, the distortion of the zoom lens system 100 in the middle state is from 0 to 2%. In FIG. 7, the curve indicates spherical aberration is from −0.02 mm to 0.02 mm.

Figure 8:
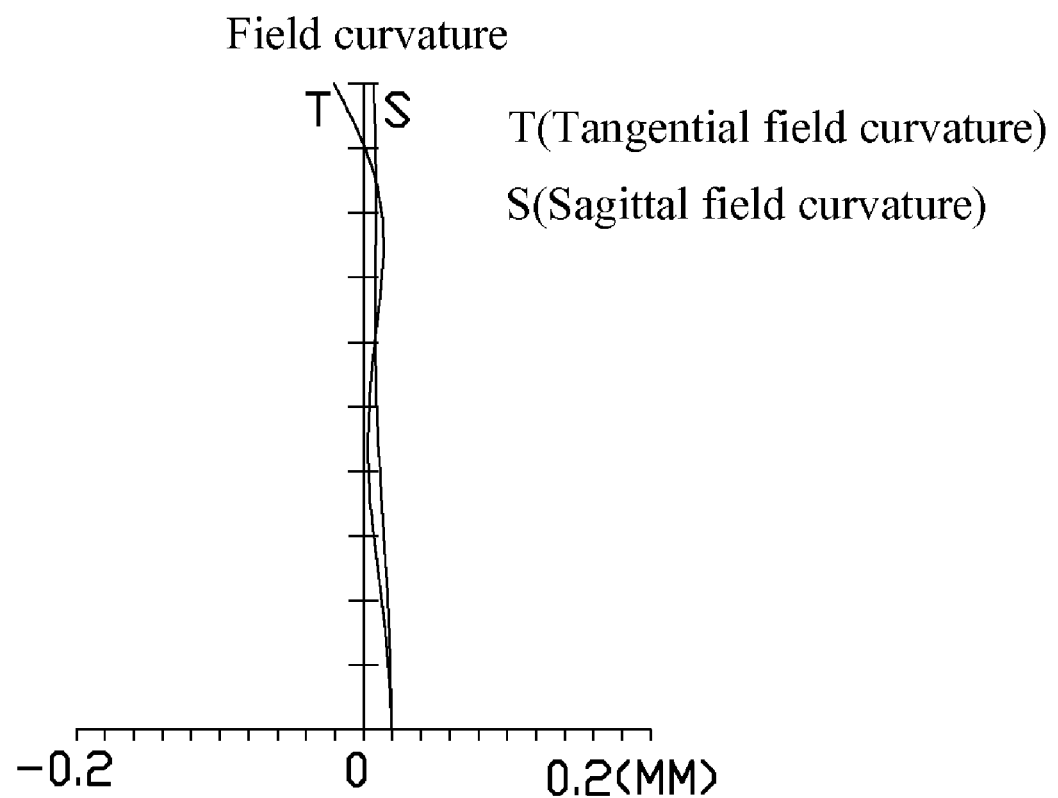
FIGS. 8~10 are graphs respectively showing field curvature, distortion and spherical aberration occurring in the zoom lens system, when the zoom lens system is in a telescopic state.
Figure 9:
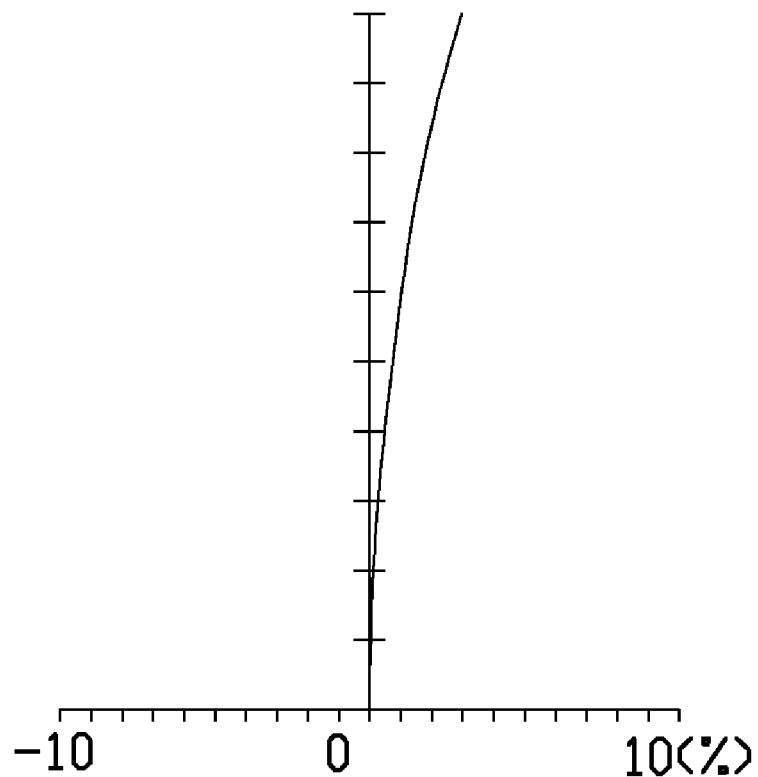
Figure 10:
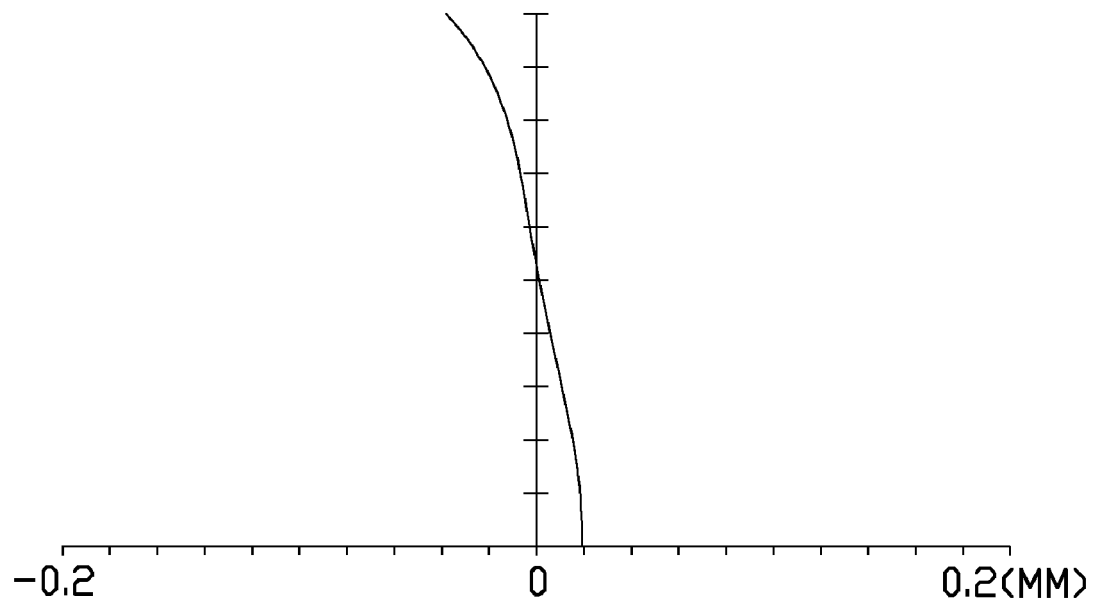

Referring to FIGS. 8-10, showing the field curvature, distortion, and spherical aberration of the zoom lens system 100 in the telescopic state are shown, and the wavelength of the light is 588 nm. In FIG. 8, the field curvature of the zoom lens system 100 in the telescopic state is from −0.42 mm to 0.02 mm. In FIG. 9, the distortion of the zoom lens system 100 in the telescopic state is from 0% to 3%. In FIG. 10, the curve indicates spherical aberration is from −0.04 mm to 0.02 mm.

In the embodiment, the moving distance of the second lens group and the total length of the zoom lens system 100 are reduced. The zoom lens system 100 can keep spherical aberration at a minimum and high resolution while reducing the total length of the zoom lens system 100.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A zoom lens system for imaging an object to an image plane, the zoom lens system, in the order from the object side to the image plane thereof, comprising:

a first lens group with positive refraction power;
a second lens group with negative refraction power;
a third lens group with positive refraction power;
an aperture stop;
a fourth lens group with positive refraction power; and
a fifth lens group with negative refraction power comprising a lens of negative refraction power and a lens positive refraction power;
wherein the first lens group, the third lens group, and the fifth lens group are immovably positioned along the optical axial of the zoom lens system, the second lens group and the fourth lens group are capable of sliding along the optical axis of the zoom lens system, the zoom lens system satisfies the formulas:

−0.18<f2/ft<−0.13; and

V11−V12<20;

wherein, f2 is the effective focal length of the second lens group, ft is the effective focal length of the zoom lens system in the telescopic state, V11 is the Abbe number of the lens of negative refraction power of the fifth lens group, V12 is the Abbe number the lens of positive refraction power of the fifth lens group.

2. The zoom lens system as claimed in claim 1, wherein in the order from the object side to the image plane, the first lens group comprises a first lens with negative refraction power, a second lens, a third lens with positive refraction power; the second lens group comprises a fourth lens with negative refraction power, a fifth lens with negative refraction power, a sixth lens with positive refraction power , and a seventh lens with negative refraction power; the third lens group comprises a eighth lens with positive refractive power; the fourth lens group comprises a ninth lens with negative refraction power, a tenth lens with negative refraction power; the fifth lens group comprises a eleventh lens with negative refraction power, a twelfth lens with positive refraction power.

3. The zoom lens system as claimed in claim 2, wherein the zoom lens system further satisfies the formula: V5−V6>50; wherein, V5 is the Abbe number of the fifth lens ; V6 is the Abbe number of the sixth lens.

4. The zoom lens system as claimed in claim 2, wherein the eighth lens is made of plastic.

5. The zoom lens system as claimed in claim 2, wherein the zoom lens system further satisfies the formula: 0.4<Ds/D<0.6; where Ds is the distance between the aperture stop to the image plane along the optical axis of the zoom lens system, D is the total length of the zoom lens system.

6. The zoom lens system as claimed in claim 5, wherein the zoom lens system further satisfies the formula: 0.1<M2/D<0.17; wherein, M2 is a moving distance which the second lens group moves from the wide angle state to the telescopic state.

7. The zoom lens system as claimed in claim 2, wherein the fifth lens and the sixth lens are bonded together by adhesive.

8. The zoom lens system as claimed in claim 7, wherein the ninth lens and the tenth lens are bonded together by adhesive.

* * * * *